(12) United States Patent
Meredith et al.

(10) Patent No.: US 10,694,363 B1
(45) Date of Patent: Jun. 23, 2020

(54) FACILITATION OF COMMUNITY NOTIFICATION FOR EMERGENCY EVENTS

(71) Applicants: AT&T Intellectual Property I, L.P., Atlanta, GA (US); AT&T Mobility II LLC, Atlanta, GA (US)

(72) Inventors: Sheldon Meredith, Roswell, GA (US); Biren Parekh, Alpharetta, GA (US); Zachary Meredith, Roswell, GA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/209,537

(22) Filed: Dec. 4, 2018

(51) Int. Cl.
| | |
|---|---|
| H04W 4/90 | (2018.01) |
| H04W 76/50 | (2018.01) |
| H04W 4/02 | (2018.01) |
| H04W 4/12 | (2009.01) |

(52) U.S. Cl.
CPC ............. *H04W 4/90* (2018.02); *H04W 4/025* (2013.01); *H04W 4/12* (2013.01); *H04W 76/50* (2018.02)

(58) Field of Classification Search
None
See application file for complete search history.

(56) References Cited

U.S. PATENT DOCUMENTS

| | | |
|---|---|---|
| 4,731,810 A | 3/1988 | Watkins |
| 5,686,886 A | 11/1997 | Stensney |
| 6,956,478 B2 | 10/2005 | Oyagi et al. |
| 7,046,985 B2 | 5/2006 | Seales et al. |
| 7,053,765 B1 | 5/2006 | Clark |
| 7,808,378 B2 | 10/2010 | Hayden |
| 8,749,383 B2 | 6/2014 | Vijayaraghavan et al. |

(Continued)

FOREIGN PATENT DOCUMENTS

| | | |
|---|---|---|
| GB | 2448196 A | 10/2008 |
| KR | 20150073247 A | 7/2015 |

(Continued)

OTHER PUBLICATIONS

"The Everbridge Mobile App." EverBridge, everbridge.com, DS_Everbridge_Mobile_App_7 .17.2. Sep. 24, 2018. 2 pages https://web.archive.org/web/20 180924150530/https ://www.everbridge.com/wp-content/uploads/20 17 /08/Everbridge-Mobile-Application. pdf.

(Continued)

*Primary Examiner* — Mazda Sabouri
(74) *Attorney, Agent, or Firm* — Amin, Turocy & Watson, LLP

(57) ABSTRACT

A system can allow users of mobile devices to opt-in to receive emergency notifications based on a source mobile device sending a notification of an emergency situation. The users of the mobile devices can filter reception of the notification based on several factors including, but not limited to location, time, type of event etc. The system can also comprise video devices capable of being activated and/or recording video in response to an indication that the notification as been sent. Additionally, notifications and identification of mobile device users intending to response to the emergency can be sent to emergency personnel to assist the emergency personnel in determining who should be at the scene of the emergency.

20 Claims, 12 Drawing Sheets

(56) References Cited

U.S. PATENT DOCUMENTS

| | | | |
|---|---|---|---|
| 9,544,163 B2 | 1/2017 | Kim et al. | |
| 9,595,072 B2 | 3/2017 | Fan et al. | |
| 9,679,467 B2 | 6/2017 | Hibbs | |
| 9,699,310 B2 | 7/2017 | Merjanian et al. | |
| 9,852,599 B1 | 12/2017 | Slavin et al. | |
| 10,033,780 B2 | 7/2018 | Siminoff et al. | |
| 10,212,555 B1* | 2/2019 | Rusu | H04W 4/029 |
| 2012/0092161 A1 | 4/2012 | West | |
| 2014/0162583 A1* | 6/2014 | Daly | H04W 4/90 |
| | | | 455/404.1 |
| 2014/0306802 A1* | 10/2014 | Hibbs, Jr. | G08B 27/006 |
| | | | 340/7.58 |
| 2015/0296358 A1* | 10/2015 | Akutsu | H04W 4/029 |
| | | | 455/404.2 |
| 2015/0358796 A1* | 12/2015 | Sarna, II | H04W 4/90 |
| | | | 455/404.2 |
| 2016/0100302 A1 | 4/2016 | Barash et al. | |
| 2016/0127531 A1* | 5/2016 | Halls | H04M 1/72536 |
| | | | 455/404.2 |
| 2017/0092109 A1 | 3/2017 | Trundle et al. | |
| 2017/0148306 A1* | 5/2017 | Wolfson | H04W 4/021 |
| 2017/0294109 A1 | 10/2017 | Hilliges et al. | |
| 2018/0033275 A1 | 2/2018 | Ginsberg et al. | |
| 2018/0040233 A1 | 2/2018 | Obaidi et al. | |
| 2019/0164406 A1* | 5/2019 | Werner | G08B 21/182 |
| 2019/0279495 A1* | 9/2019 | Nishioka | H04W 4/90 |

FOREIGN PATENT DOCUMENTS

| | | |
|---|---|---|
| WO | 9603729 A1 | 2/1996 |
| WO | 0135361 A1 | 5/2001 |
| WO | 2008045003 A1 | 4/2008 |
| WO | 2011078634 A1 | 6/2011 |

OTHER PUBLICATIONS

"Emergency: app alerts first responders." Medica Magazine, medicatradefair.com. Sep. 24, 2018.5 pages. https://web.archive.org/web/20180924150722/https://www.medicatradefair.com/cgibin/md_med ica/l i b/ pu bltt.cg i/Emergency _a pp a lerts_fi rst_ responders. html?oid=79720&lang=2.

* cited by examiner

FACILITATION OF COMMUNITY NOTIFICATION FOR EMERGENCY EVENTS

TECHNICAL FIELD

This disclosure relates generally to facilitating community notifications for emergency events. More specifically, this disclosure relates to facilitating community notifications for emergency events for mobile devices that have opted into an emergency event group.

BACKGROUND

Alarms or emergency notifications are typically sent to security management firms or perhaps directly to a police public safety answering point (e.g., 911 operator). However, in some geographic areas, it can take emergency services half an hour to respond to such notifications, either due to distance or perhaps traffic conditions. Consequently, the increased response time can lead to increased negative consequences for individuals experiencing the emergency situation.

The above-described background relating to facilitating community notifications for emergency events is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
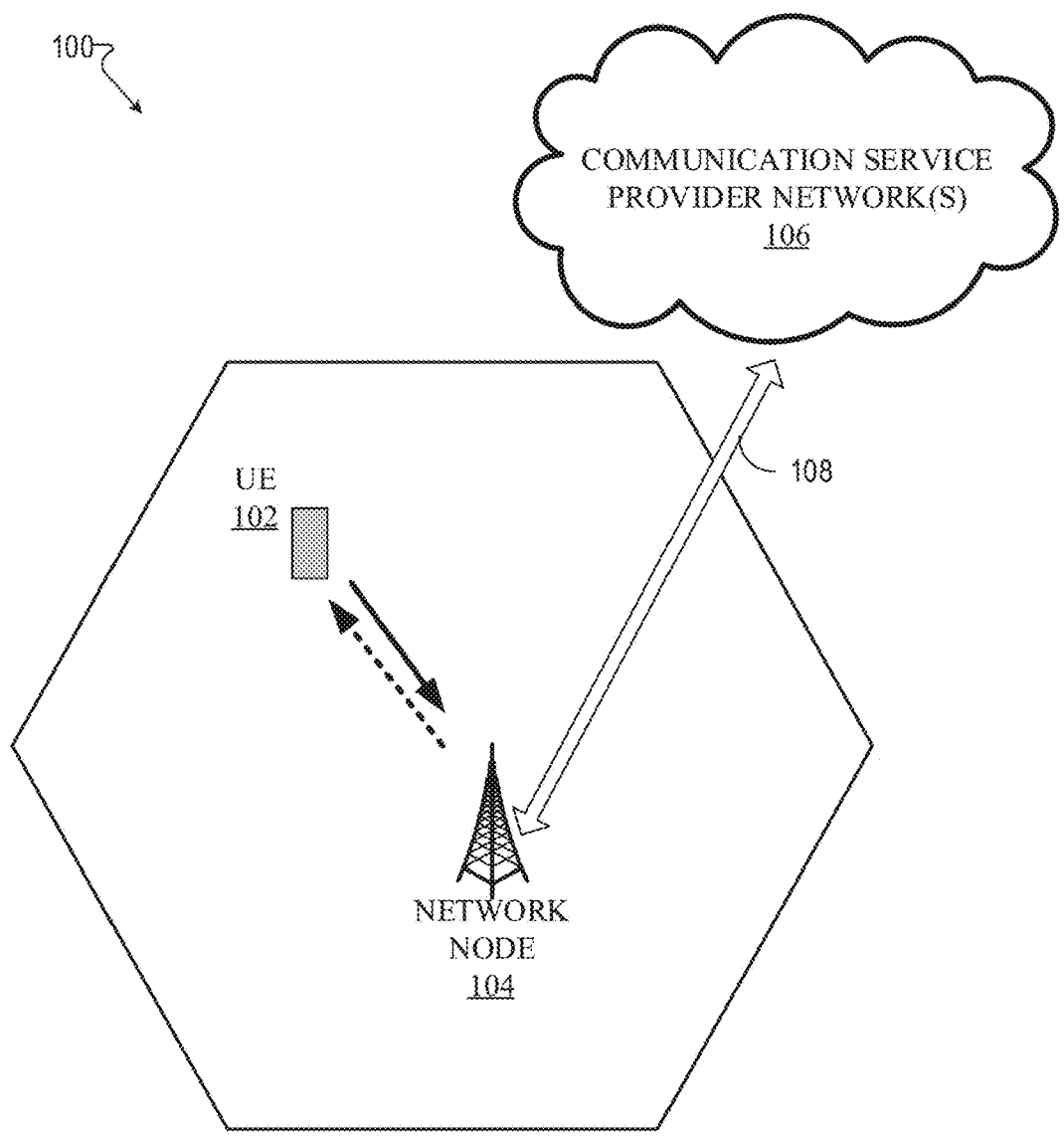
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate community notifications for emergency events between mobile devices and network devices.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate community notifications for emergency events between mobile devices and network devices. Facilitating community notifications for emergency events between mobile devices and network devices can be implemented in connection with any type of device with a connection to the communications network such as: a mobile handset, a computer, a handheld device, or the like.

A system and method are described that can allow an alarm event to be sent to a set of mobile devices, fixed wireless devices, and/or fixed wired devices that are part of an opted-in community of users. The alarm event notification can comprise the alarm type and the notifications can be selectively sent to other devices based on geographic distance to them, the status of notified device, and user-specific rules that filter the types of events to be sent to other such devices.

A response (human or robotic) to an emergency situation sooner than emergency services can increase a positive outcome of the emergency situation. Although, there are existing security systems that permit notification by email of multiple phone numbers or email addresses, the target recipients are blindly contacted irrespective of the type of alarm, distance, time of day, or status of the potential recipient. Typically, these notification targets are known (to the sender) phone numbers and email addresses. They also may belong to the same person or small number of people, implying the span of notifications is narrow. For instance, a home alarm can go to a mobile device of the homeowner and no one else.

A community notification system can comprise a community of wireless mobile devices, wireless fixed devices, and/or wired fixed devices belonging to a group of individuals who are collectively part of a notification response community. The community can comprise individuals that have opting-in to the collective group. Such collective members can pass a set of trust criteria prior to admission to the community. Once admitted, each member can select the types of event notifications they are willing to receive based on distance, time of day, and/or status of the member. For example, some members can be contacted by the security company of a neighbor for the purpose of walking to the neighbor's house to check on someone. Some persons may be willing to entertain communication from the police to do something like checking if there is an unrecognized vehicle outside of a home. Some may accept home or business alarms that might allow them to go outside and perhaps photograph people or vehicles that may be involved in a nefarious event, such as a break-in. Others may be willing to accept medical event notifications if they are qualified medical first responders. Once members have opted-in, their devices, and their "acceptance rules" can be configured in the proposed system so that it becomes possible for a device to notify nearby devices and users of alarm events using the proposed system. Consequently, the location of the member's mobile device can be know with respect to the locations of other devices in the community and can vary depending on the event or notification type. The aforementioned criteria can be displayed on the member's mobile device to allow the member to select the criteria for which they would like to be contacted during and/or in anticipation of an emergency event.

To initiate an action, a source device can presents an alarm to a processing system including its location via a fixed wired or wireless network. The processing system can then search for nearby community devices and apply their specific criteria (e.g., filters) based on the alarm type from the source device. The community device users can then be notified via a mobile software application, on their mobile devices, of the alarm event, the affected person/member, a description/name of the affected person/member, the location, etc. A map can be provided to display the location of both the source, target device, and/or other nearby community mobile devices as well as navigation guidance if dynamically requested by the target device. If the member accepts (chooses to respond to the notification), that person's information (e.g., name, picture, credentials, estimated time of arrival, etc.) can also be sent to authorities to inform them prior to arriving. The member's information (e.g., name, picture, credentials, etc.) can also be sent to the source device to inform the user of the source device of who is going to respond. The processing system can also limit the number of acceptances from community devices so as to not create a situation where too many responders interfere with each other or otherwise create chaos. Furthermore, the limited number of devices with user acceptances can be shared with each other, so that responders might be made aware of each other prior to arrival on scene. The GPS or WI-FI-proxy-based device locations of other responders (e.g., police, fire, members of the collective) can also be shown dynamically on the screen of a mobile device. When the emergency situation is resolved, a member of the community can send an "all clear" notification to the collective responders via the processing system. This can include police and/or fire department notifications, thereby disengaging other responding members so that they do not waste time responding. In another embodiment, a member that has accepted the request to respond, can abandon their acceptance if they are unable to complete the request due to some interfering issue (e.g., stuck in traffic) so that the request then opens back up to the community. Alternatively, users that have accepted can be placed in priority pool, so that if user 1 has to abandon the acceptance, then the system can automatically default to another user (e.g., user 2) that has accepted as well. In the interim, user 2 would be placed in an "on-call" mode indicating that should something affect user 1's performance, user 2 would be next in line to respond to the emergency. Being "on-call" with a lower priority can also be used a criteria that the member can set with regards to notifications. The processing system and mobile application can also allow a community member to extend a membership offer to known devices/users. Once a member of the community, any user can register their additional devices and apply notification rules.

In order to know the location of the source device or any other device in the community, the proposed system can use device-reported GPS location, either passively or on-demand, proxy location by WI-FI observation (SSID/MAC address), proxy location by observation of another nearby device with a known location, and/or any other accurate location technologies such as near-field-radio, uplink time difference of arrival (UTDOA), downlink time difference of arrival (DTDOA), and/or variants of satellite-based locating.

The target notification devices can also comprise robotics, such as drones. Drones can be notified by the processing system via wireless networks to travel to the location for prescribed alarm events and collect imagery that might be used post-facto for crime scene investigation. Having imagery of vehicles and people can also be a crime deterrent. This concept extends as well to fixed cameras and autonomous or manually operated vehicles that can be automatically recruited to collect imagery near the alarm location. For instance, if an burglary alarm is presented from a source device at a location, various community devices can be notified in parallel with the authorities, and light post cameras and cameras in nearby vehicles can be activated to start collecting and reporting imagery that can be used in subsequent analyses.

It should also be noted that an artificial intelligence (AI) component can facilitate automating one or more features in accordance with the disclosed aspects. A memory and a processor as well as other components can include functionality with regard to the figures. The disclosed aspects in connection with community notification for emergency situations can employ various AI-based schemes for carrying out various aspects thereof. For example, a process for detecting one or more trigger events, reducing a number of community members contacted as a result of the one or more trigger events, and modifying one or more reported measurements, and so forth, can be facilitated with an example automatic classifier system and process. In another example, a process for penalizing one community member while preferring another can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to identifying which community members are more likely to respond, modifying one or more reported emergency details, incenting community members that are closer but have a lower likelihood to respond to respond first, and so forth. The criteria can include, but is not limited to, predefined values, frequency attenuation tables or other parameters, service provider preferences and/or policies, and so on.

In one embodiment, described herein is a method comprising sending, by a first mobile device comprising a processor, affiliation data representative of a request to be affiliated with a group of mobile devices associated with emergency services and sending, by the first mobile device, event type data specifying a type of emergency services event for which the first mobile device is to be notified by a second mobile device of the group of mobile devices. In response to the sending the affiliation data and the sending the event type data, the method can comprise receiving, by the first mobile device from the second mobile device, event indication data indicative that an event of the type of emergency services event has been determined to have occurred. In response to the receiving the event indication data, the method can comprise sending, by the first mobile device to the second mobile device, location data associated with a location of the first mobile device. Furthermore, based on a threshold value associated with responses from the group of the mobile devices being determined to have been satisfied, the method can comprise displaying, by the first mobile device, a status indication via a user interface of the first mobile device.

According to another embodiment, a system can facilitate, receiving, from a first mobile device, request data representative of a request to be affiliated with mobile devices. The system can comprise receiving, from the first mobile device, event type data associated with an emergency services event for which emergency services event data is to be received by the first mobile device and receiving, from a second mobile device of the mobile devices, emergency services event data indicative of the emergency services event having been determined to have occurred. In response to the receiving the emergency services event data, the system can comprise sending notification data, indicative of the emergency services event having been determined to have occurred, to the first mobile device. Additionally, in response to the sending the notification data, the system can comprise receiving, from the first mobile device, acceptance data indicative of an acceptance of the emergency services event.

According to yet another embodiment, described herein is a machine-readable storage medium that can perform the operations comprising receiving, from a first mobile device of mobile devices, event type data associated with a type of emergency services event to be received by the first mobile device and receiving, from a second mobile device of the mobile devices, event data indicative of the emergency services event having occurred. In response to the receiving the event data, the machine-readable storage medium can perform the operations comprising sending notification data, indicative of the emergency services event having occurred, to the first mobile device. Additionally, in response to the sending the notification data, the machine-readable storage medium can perform the operations comprising receiving, from the first mobile device, acceptance data indicative of a commitment to perform an action to mitigate an emergency associated with the emergency services event.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for LTE advanced systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ LTE advanced wireless networking features and functionalities. LTE advanced wireless communication networks are expected to fulfill the demand of exponentially increasing data traffic and to allow people and machines to enjoy gigabit data rates with virtually zero latency.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain.

Figure 2:
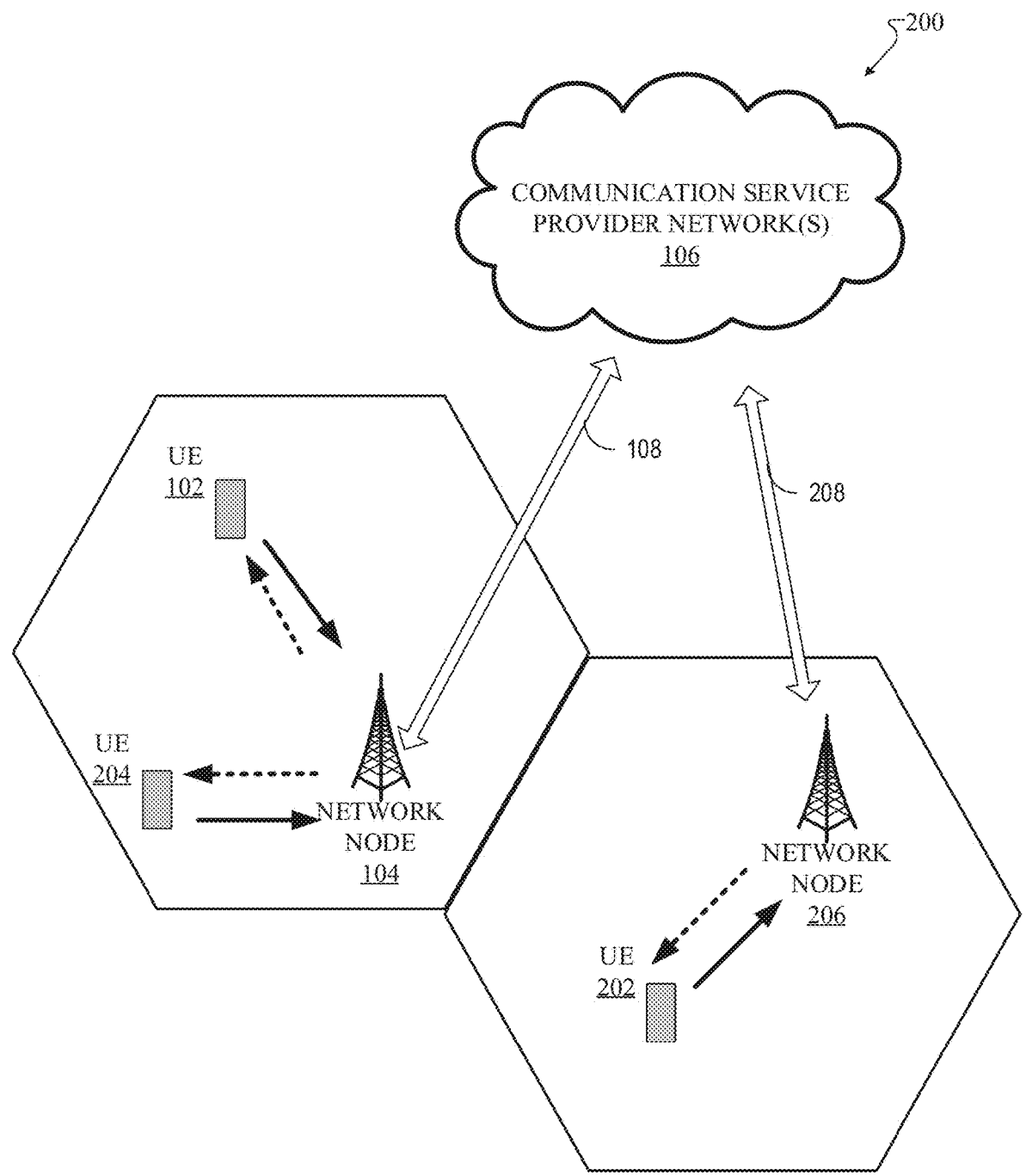
FIG. 2 illustrates an example wireless communication system in which a mobile device can be sent a message based on an emergency occurrence according to one or more embodiments.

Referring now to FIG. 2, illustrated is an example wireless communication system 200 in which a mobile device can be sent a message based on an emergency occurrence according to one or more embodiments. Repetitive description of like elements employed in other embodiments described herein is omitted for sake of brevity.

The UE 102 can be the mobile device of a user that is currently experiencing or about to experience an emergency situation. Based on this information, the user can prompt the UE 102 to send a notification of such to the community of emergency responders, which can comprise UEs 204, 202. The notification can be sent to the communication service provider network 106 via the network node 104. It should be noted that the notification can also be sent to mobile devices that are affiliated with different service providers than the service provider associated with the UE 102 (e.g., UE 202). The UE 202 can receive the notification data from the network node 206, and the UE 204 can receive the notification data from the network node 104.

Whether the UEs 202, 204 receive the notification can be based on criteria set by the user of the UEs 202, 204. For example, the UE 204 can filter notifications by indicating that the UE 202 should not receive any emergency notifications that require cardiopulmonary resuscitation (CPR). Thus, if the response to the notification sent by UE 102 requires CPR, then the UE 204 would not receive the notification.

In an alternate embodiment, reception of the notification can be premised on a distance between the source UE 102 and potential receiving UEs 204, 202. For example, if UE 202 is 10 miles away from the UE 102 and the UE 204 is only 5 miles away from the UE 102, then the UE 202 can be precluded from receiving the notification because the UE 202 is too far away the UE 102 to be of any meaningful assistance for the emergency situation. Additionally, the UE 202 can have a filter set that would prevent reception of any notification requiring more than a specific travel distance and/or travel time. Alternatively, the UE 102 can set filters with regards to the potential responding UEs 202, 204. For example, the UE 102 can set the criteria that it would only like to notify UEs that are a specific distance and/or time of travel from the emergency situation.

Figure 3:
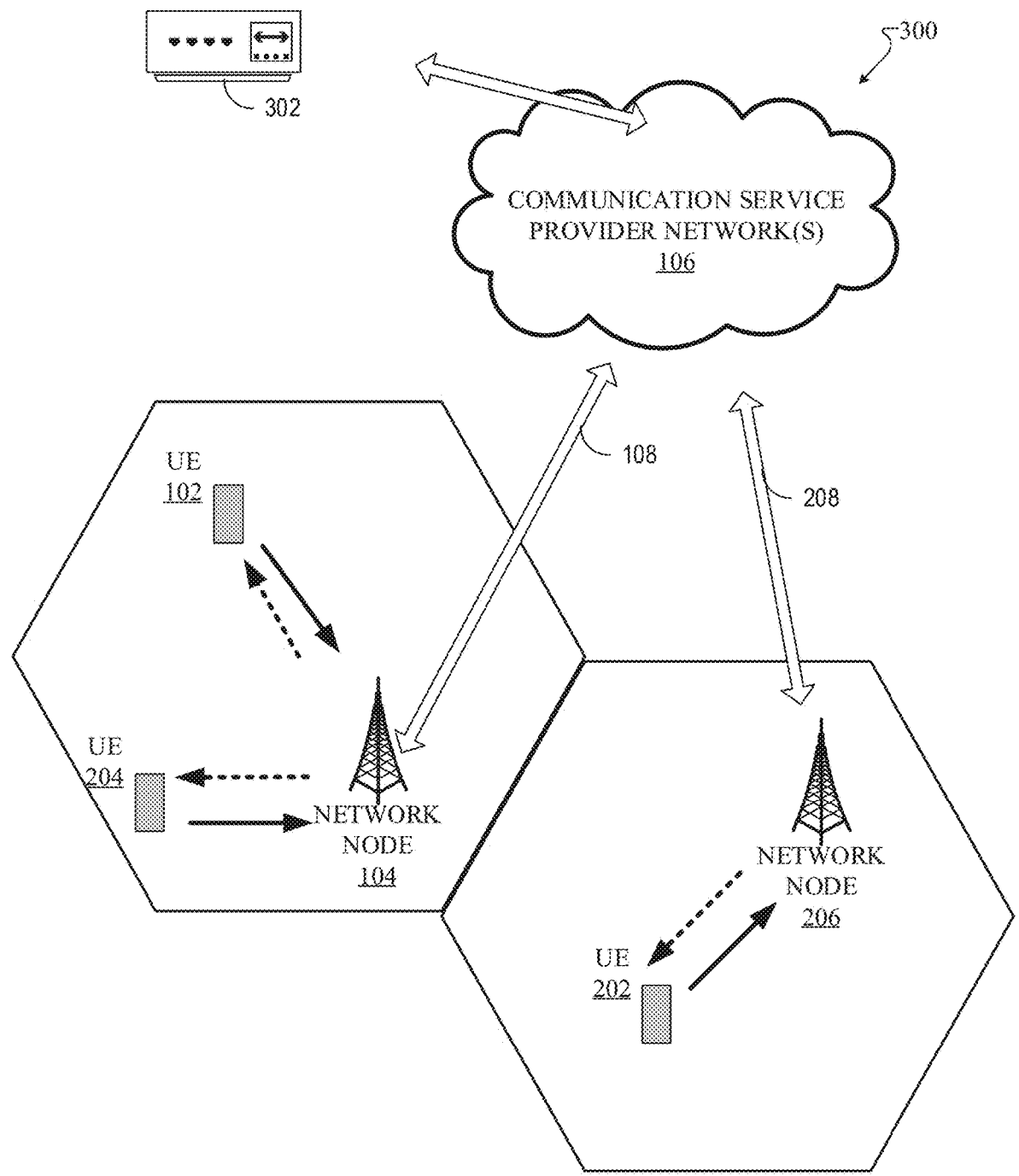
FIG. 3 illustrates an example wireless communication system in which a mobile device and an emergency services provider device can be sent a message based on an emergency occurrence according to one or more embodiments.

Referring now to FIG. 3, illustrated is an example wireless communication system in which a mobile device and an emergency services provider device can be sent a message based on an emergency occurrence according to one or more embodiments. Repetitive description of like elements employed in other embodiments described herein is omitted for sake of brevity.

In another embodiment, an emergency services device 302 accessed by emergency services personnel can receive the notifications from the UE 102. For example, if UE 102 sends out a notification, in addition to the notification being sent to the UEs 202, 204, the notification can be sent to the emergency services device 302 to alert emergency services personnel that a third-party may intervene to assist the user of UE 102 prior to emergency services personnel arriving. This can help the emergency services personnel to eliminate confusion regarding additional people on the scene of the emergency. In another embodiment, when one of the community devices accepts replies to the notification, indicating that they are willing to assist, the user profile information (e.g., name, picture, credentials, estimated time of arrival, etc.) can be sent to the UE 102 and the emergency services device 302. This can allow the emergency services personnel to identify 3rd parties that are on the scene when they arrive. Additionally, a wireless communication connection can be formed between the emergency services device 302 and the UE 202 that responds to the emergency. For instance, if the UE 202 responds to the emergency and the user of the UE 202 is not CPR certified, then emergency services personnel can communicate with the user via the emergency services device 302 and the UE 202 to help facilitate the administration of CPR to the afflicted party.

Figure 4:
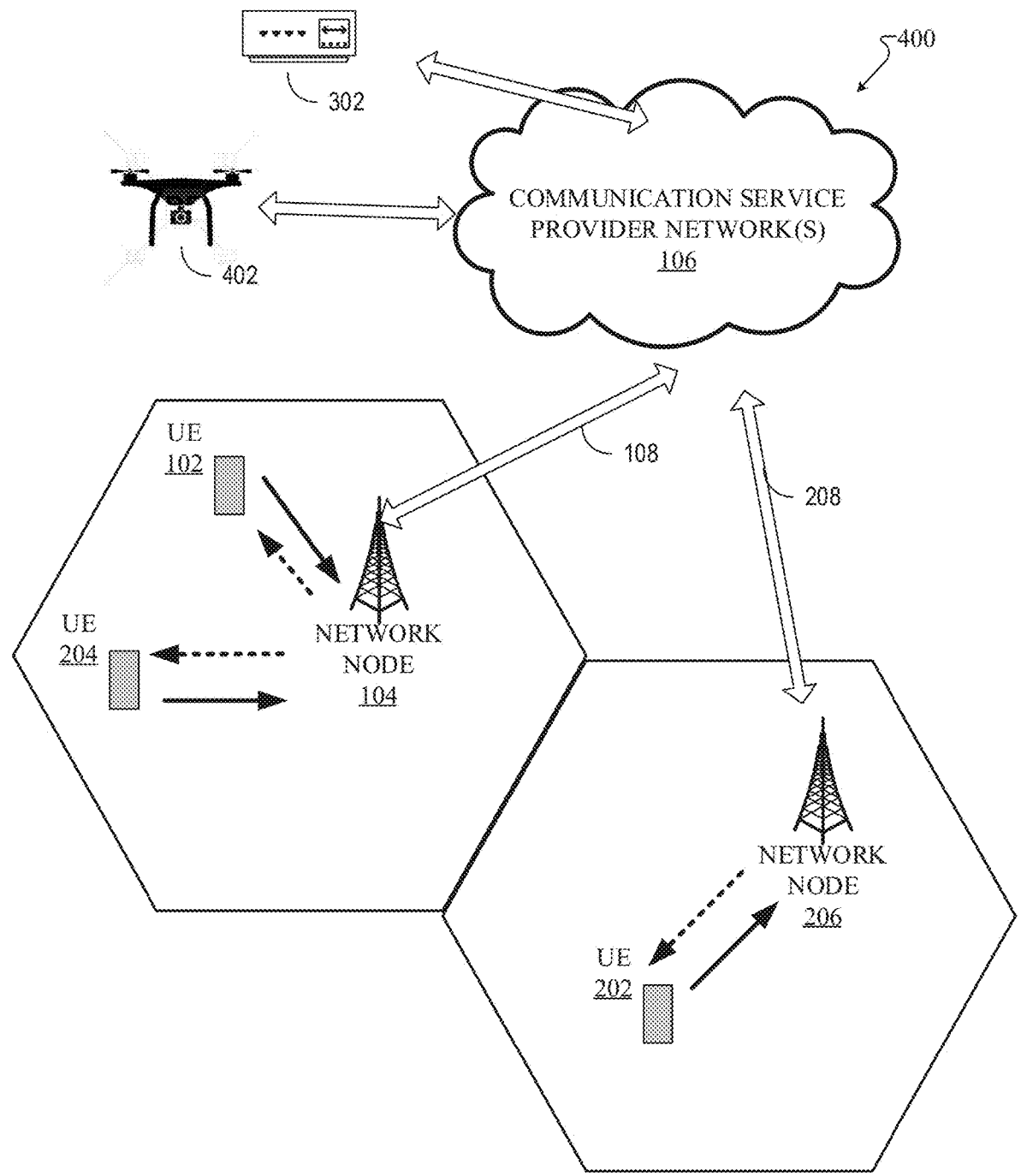
FIG. 4 illustrates an example wireless communication system in which a drone device can be sent a message based on an emergency occurrence according to one or more embodiments.

Referring now to FIG. 4, illustrated is an example wireless communication system in which a drone device can be sent a message based on an emergency occurrence according to one or more embodiments. Repetitive description of like elements employed in other embodiments described herein is omitted for sake of brevity.

In another embodiment, a drone device 402 can be used to provide live video of the scene where the emergency is taking place. For instance, a transmission of the notification from the network nodes 104, 206 to the communication provider network 106 via the backhaul links 108, 208 can trigger an instruction to be sent to the drone device 402 to fly to the location of the emergency and begin taking video and/or photographs. Because the GPS coordinates of the source device are known, this data can be sent in the notification so that the drone can determine where to fly. Based on AI, the drone can also follow an individual that the drone believes to be a person(s) of interest (e.g., witnesses, suspects, etc.) with regards to the emergency and record their location and/or statement of events.

Figure 5:
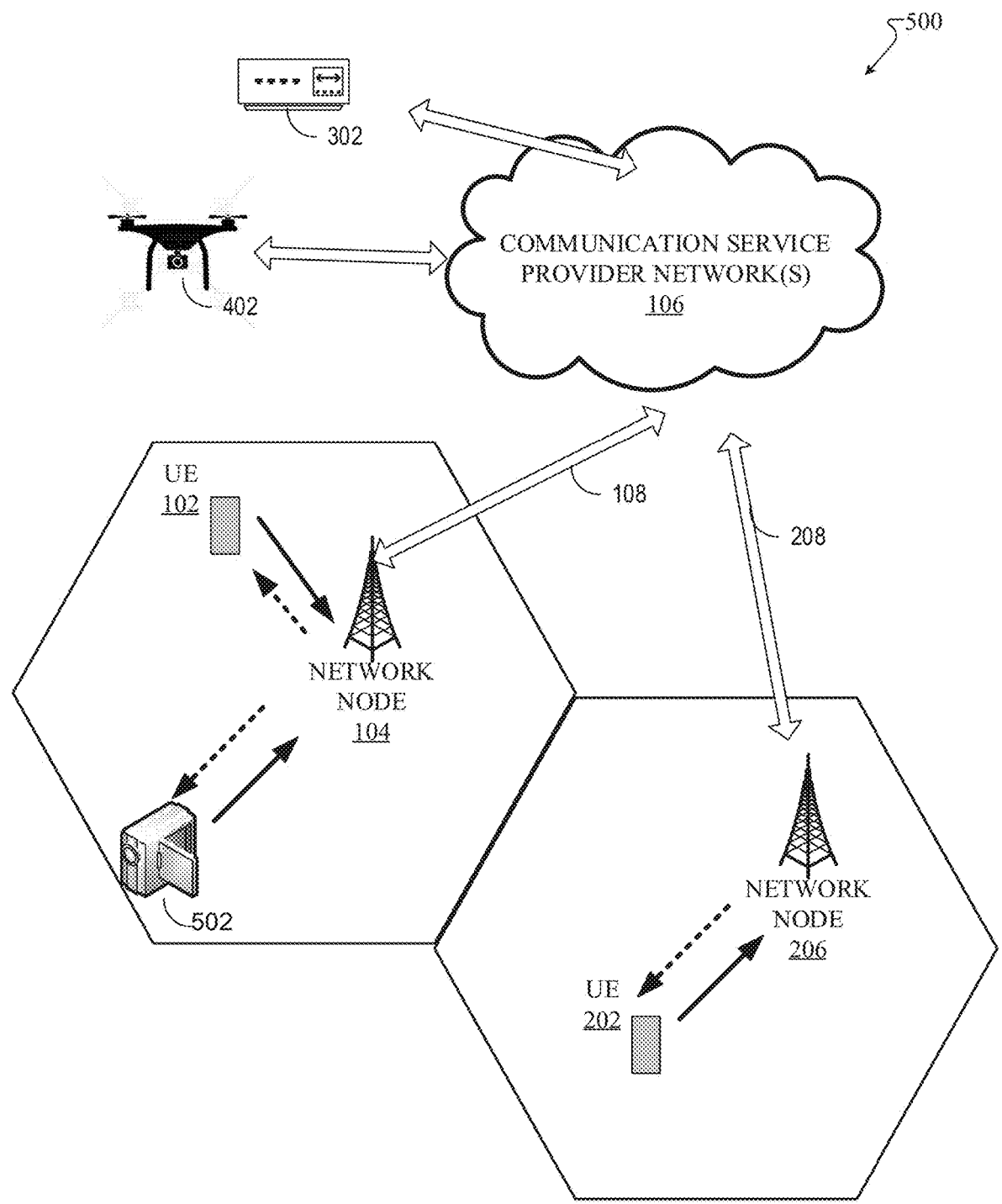
FIG. 5 illustrates an example wireless communication system in which a video recorder device can be sent a message based on an emergency occurrence according to one or more embodiments.

Referring now to FIG. 5, illustrated is an example wireless communication system in which a video recorder device can be sent a message based on an emergency occurrence according to one or more embodiments. Repetitive description of like elements employed in other embodiments described herein is omitted for sake of brevity.

In another embodiment, a video device 502 can also be used to provide live video of the scene where the emergency is taking place. For purposed of this disclosure, it should be noted that the video device 502 can also be a camera or any electronic device capable of taking pictures and/or videos. For instance, a transmission of the notification from the network nodes 104, 206 to the communication provider network 106 via the backhaul links 108, 208 can trigger an instruction to be sent to the video device 502 to begin taking video and/or photographs. Because the GPS coordinates of the source device are known, this data can be sent in the notification so that the video device 502 know when and where to record.

Figure 6:
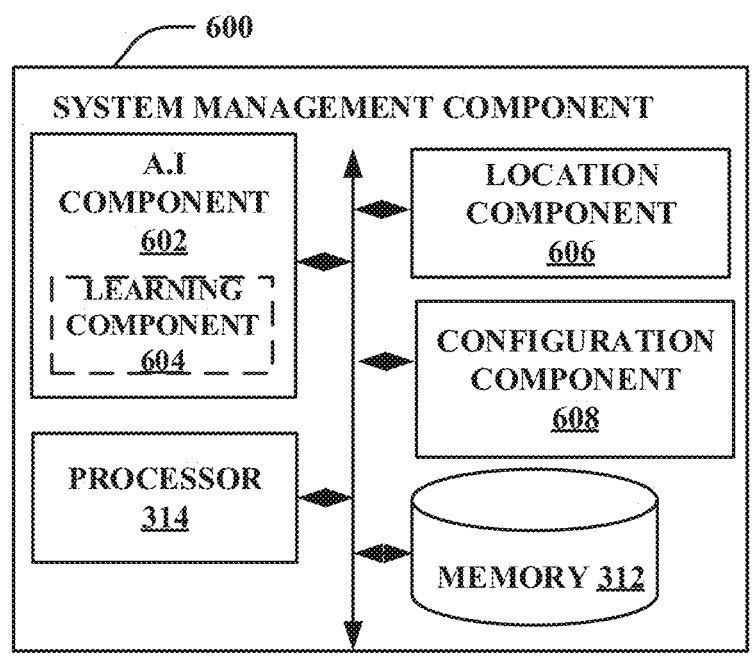
FIG. 6 illustrates an example schematic system block diagram of a system management component according to one or more embodiments.

Referring now to FIG. 6, illustrated is an example schematic system block diagram of a system management component according to one or more embodiments. Repetitive description of like elements employed in other embodiments described herein is omitted for sake of brevity.

In the embodiment shown in FIG. 3, the system management component 600 can comprise several sub-components (e.g., AI component 602, learning component 604, location component 606, and configuration component 608), processor 612, and memory 610 can be electrically and/or communicatively coupled to one another. It should also be noted that in alternative embodiments that other components including, but not limited to the sub-components, processor 612, and/or memory 610, can be external to the system management component 600. For instance, in another embodiment, the configuration component 608 can be external to the system management component 600.

The AI component 602 can also comprise the learning component 604, wherein the learning component 604 can analyze emergency situations and input data received from UEs 102, 202, 204, the drone device 402, and/or the video device 502 to predict future emergency notifications. For example, if a previous GPS location has previously been prone to being associated with notifications of source UE 102, then this info can be stored and analyzed by the location component 606 and utilized in accordance with a learning algorithm to incentive users of community devices to remain located near the location for longer periods of time just in case a notification occurs. The configuration component 608 can configure UEs 102, 202, 204 based on the user's opt-in preferences, the type of UE device, the type of emergencies to be notified about, a time of day and/or night, a location, a distance from the source UE device, etc.

Aspects of the processor 612 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the system management component 600. In an aspect, the system management component 600 can also include memory 610 that stores computer executable components and instructions.

Figure 7:
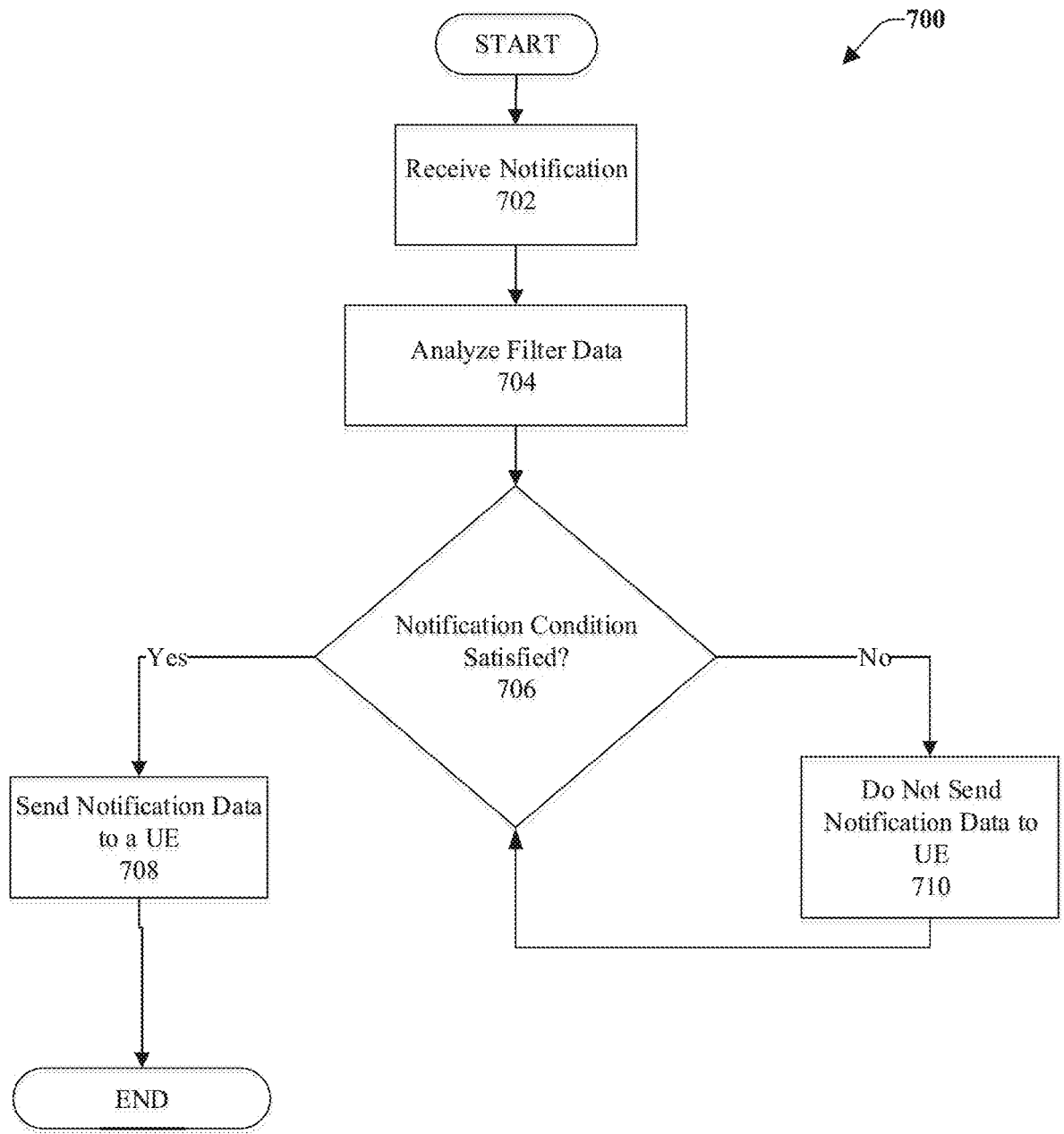
FIG. 7 illustrates an example flow chart for facilitating community notifications for emergency events according to one or more embodiments.

Referring now to FIG. 7, illustrated is an example flow chart for facilitating community notifications for emergency events according to one or more embodiments. Repetitive description of like elements employed in other embodiments described herein is omitted for sake of brevity.

At block 702, the system can receive a notification of an emergency event from the UE 102. I response to receiving the notification, the system can analyze the notification against filter parameters associated with other UEs 202, 204 that have opted into the community. If the notification conditions are satisfied at decision block 706, then the system can send the notification to the UE at block 708 for which the condition has been determined to have been satisfied. However, if the notification conditions are not satisfied at decision block 706, then the system can decline sending the notification to the UE at block 710 where the condition has been determined to have not been satisfied. Instead, the system can enter a recurring loop scenario, wherein the system can then analyze notification conditions associated with other UEs to determine if there is indeed a UE that meets the criteria to send the notification to at block 708. It should be noted that the system can perform these operations in chronological order to prevent multiple UEs from being notified, or the system can perform these operations simultaneously for a subset of the community, wherein the subset can be based on other criteria (e.g., location, time, know-how, credentials, etc.).

Figure 8:
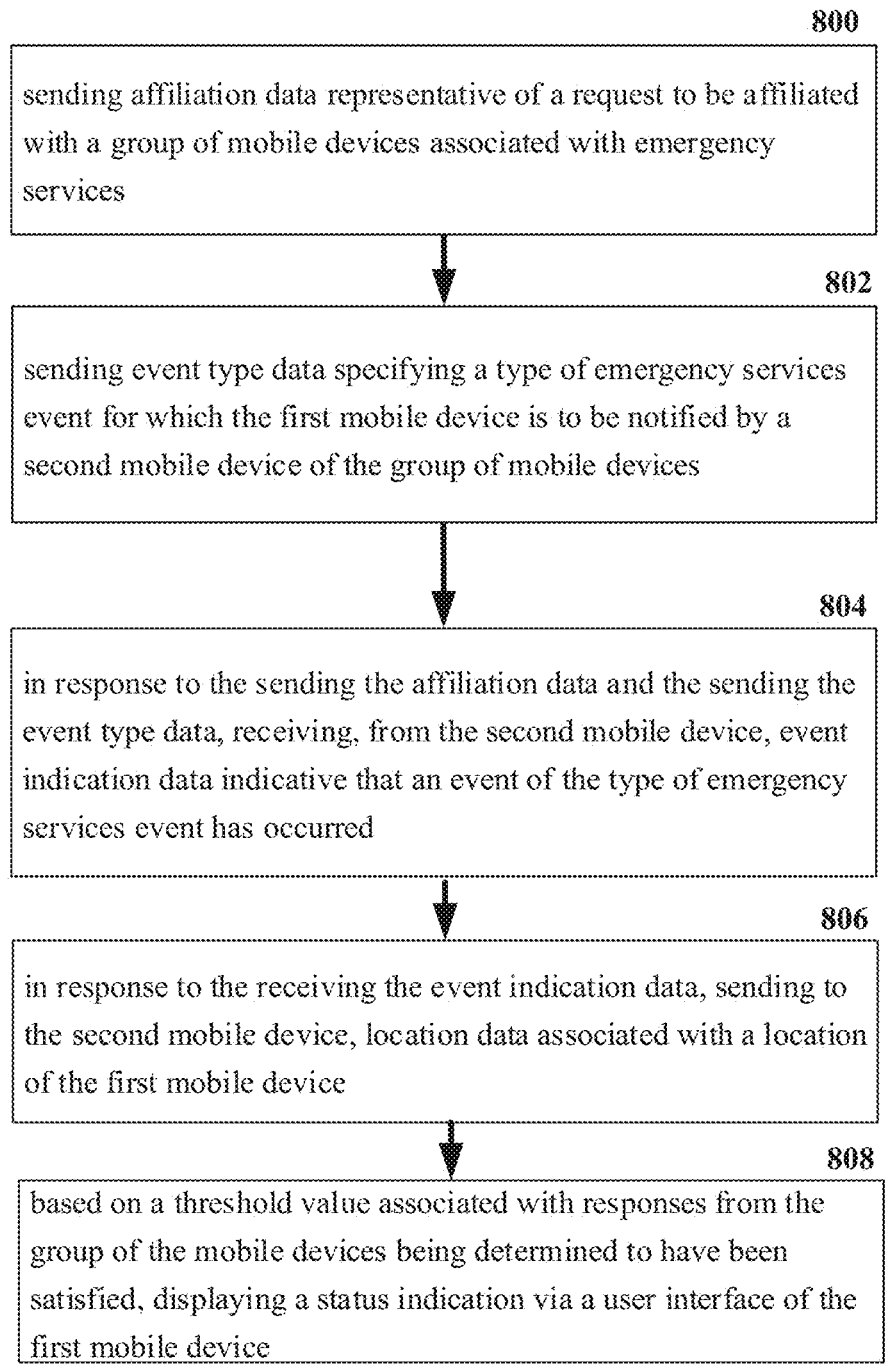
FIG. 8 illustrates an example flow chart for a method for facilitating community notifications for emergency events according to one or more embodiments.

Referring now to FIG. 8, illustrated is an example flow chart for a method for facilitating community notifications for emergency events according to one or more embodiments. Repetitive description of like elements employed in other embodiments described herein is omitted for sake of brevity.

At element 800, a method can comprise sending (e.g., via UE 202) affiliation data representative of a request to be affiliated with a group of mobile devices associated with emergency services (e.g., UE 102, 204). At element 802, the method can comprise sending (e.g., via UE 202) event type data specifying a type of emergency services event for which the first mobile device (e.g., via UE 202) is to be notified by a second mobile device (e.g., via UE 102) of the group of mobile devices (e.g., UE 102, 202, 204). In response to the sending (e.g., via UE 202) the affiliation data and the sending (e.g., via UE 202) the event type data, at element 804, the method can comprise receiving (e.g., via UE 202) event indication data indicative that an event of the the type of emergency services has occurred. In response to the receiving the event indication data, at element 806, the method can comprise sending (e.g., via UE 202) location data associated with a location of the first mobile device (e.g., via UE 202). Furthermore, at element 808, based on a threshold value associated with responses from the group of the mobile devices (e.g., UE 102, 204) being determined to have been satisfied, the method can comprise displaying a status indication via a user interface of the first mobile device. For example if three UE's (e.g., UE 102, 202, 204) have responded to the notification, and only two UE's (e.g., UE 202, 204) associated with two users are needed to assist the during the emergency, the third user can receive an indication, via the display of the UE (e.g., UE 102), that his/her services are no longer needed. Alternatively, the rejected user's UE (e.g., UE 102) can be placed in a queue of UE users that can still assist should the other two UE users experience some type of interfering scenario that prevents them from assisting.

Figure 9:
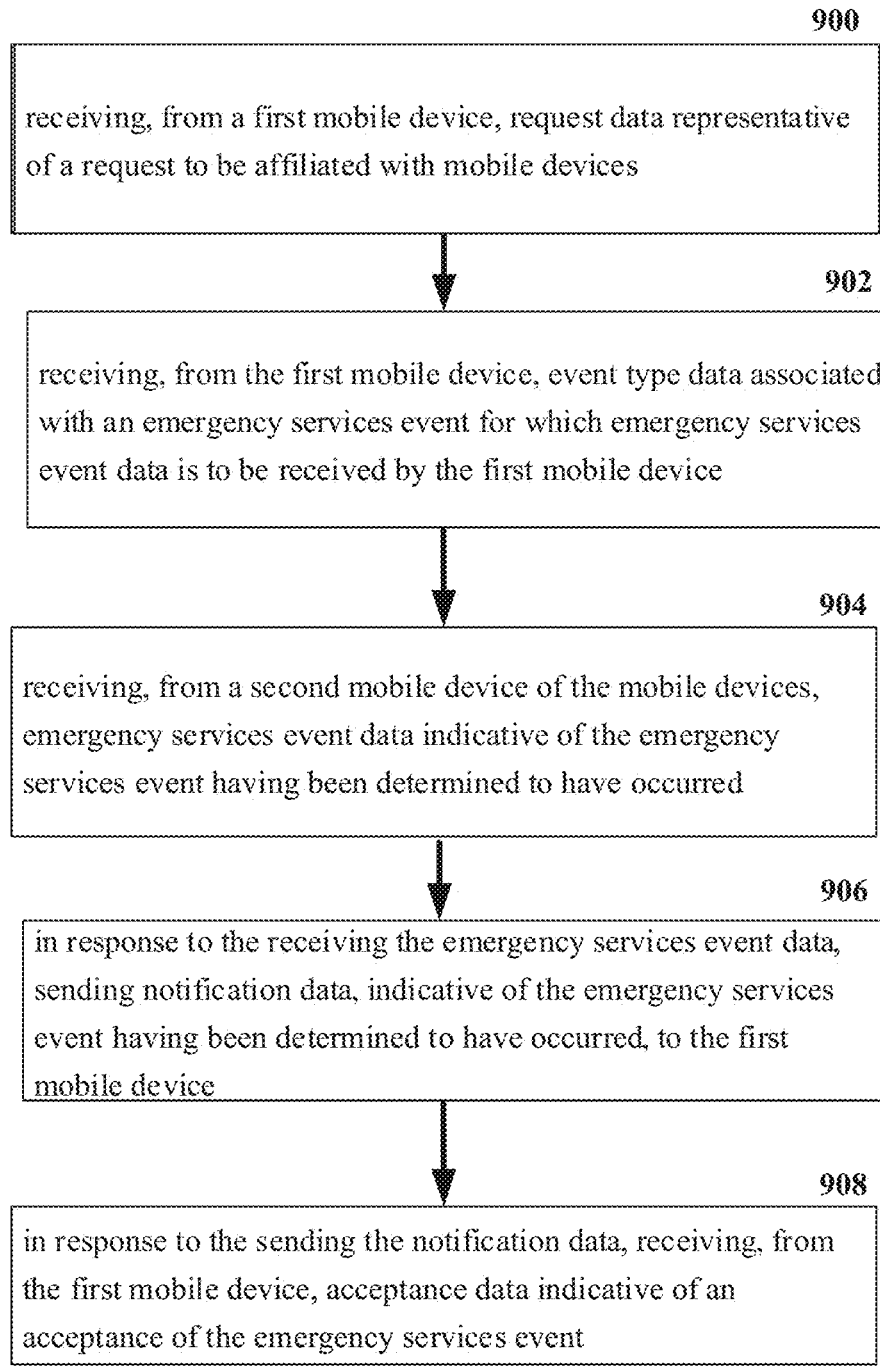
FIG. 9 illustrates an example flow chart for a system for facilitating community notifications for emergency events according to one or more embodiments.

Referring now to FIG. 9, illustrated is an example flow chart for a system for facilitating community notifications for emergency events according to one or more embodiments.

At element 900, a system can facilitate, receiving, from a first mobile device, request data representative of a request to be affiliated with mobile devices. The system can comprise receiving, from the first mobile device (e.g., UE 202), event type data associated with an emergency services event for which emergency services event data is to be received by the first mobile device (e.g., UE 202) at element 902. Additionally, the system can comprise receiving, from a second mobile device (e.g., UE 102) of the mobile devices (e.g., UE 102, 202, 204), the emergency services event data indicative of the emergency services event having occurred at element 904. In response to the receiving the emergency services event data, at element 906, the system can comprise sending notification data, indicative of the emergency services event having occurred, to the first mobile device (e.g., UE 202). Additionally, at element 908, in response to the sending the notification data, the system can comprise receiving, from the first mobile device (e.g., UE 202), acceptance data indicative of an acceptance of the emergency services event.

Figure 10:
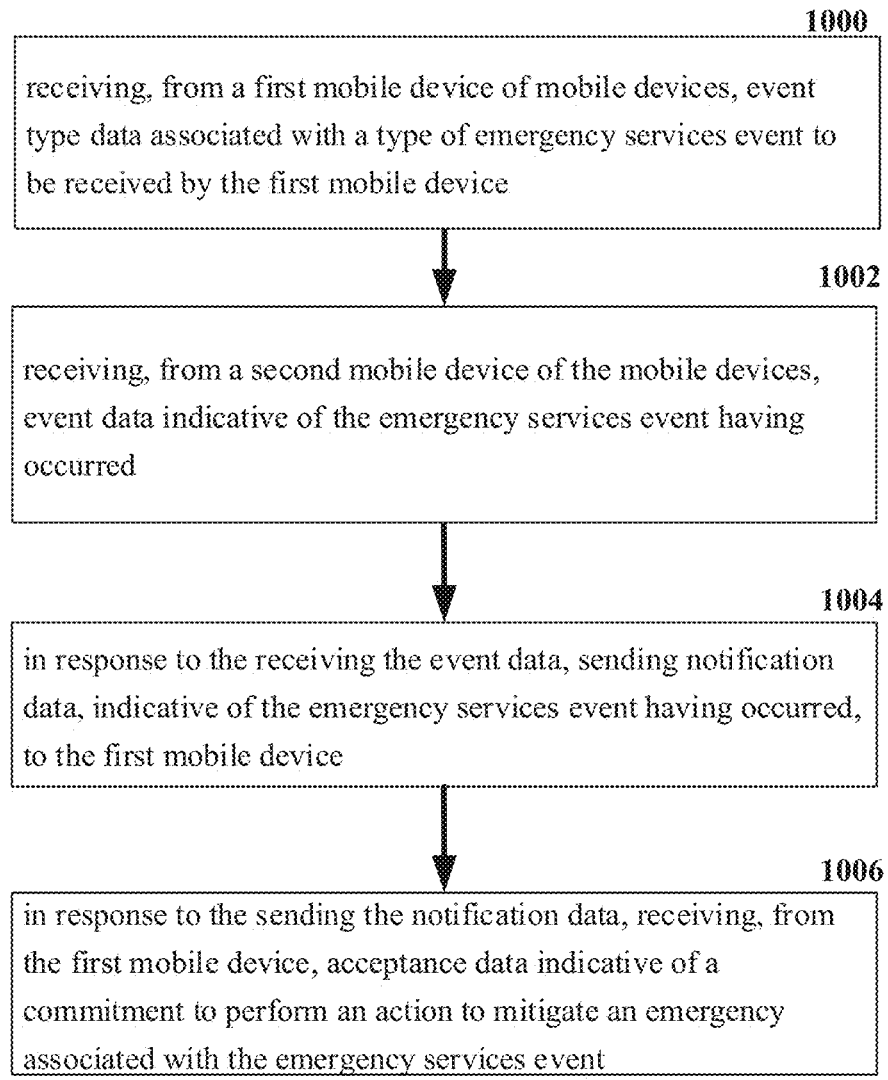
FIG. 10 illustrates an example flow chart for a machine-readable medium for facilitating community notifications for emergency events according to one or more embodiments.

Referring now to FIG. 10, illustrated is an example flow chart for a machine-readable medium for facilitating community notifications for emergency events according to one or more embodiments.

At element 1000, a machine-readable storage medium can perform the operations comprising receiving, from a first mobile device (e.g., UE 202) of mobile devices (e.g., UE 102, 202, 204), event type data associated with a type of emergency services event to be received by the first mobile device (e.g., UE 202). Additionally, at element 1002, the machine-readable storage medium can perform the operations comprising receiving, from a second mobile device (e.g., UE a02) of the mobile devices (e.g., UE 102, 202, 204), event data indicative of the emergency services event having have occurred. In response to the receiving the event data, the machine-readable storage medium can perform the operations comprising sending notification data, indicative of the emergency services event having occurred, to the first mobile device (e.g., UE 202) at element 1004. Additionally, in response to the sending the notification data, at element 1006, the machine-readable storage medium can perform the operations comprising receiving, from the first mobile device (e.g., UE 202), acceptance data indicative of a commitment to perform an action to mitigate an emergency associated with the emergency services event.

Figure 11:
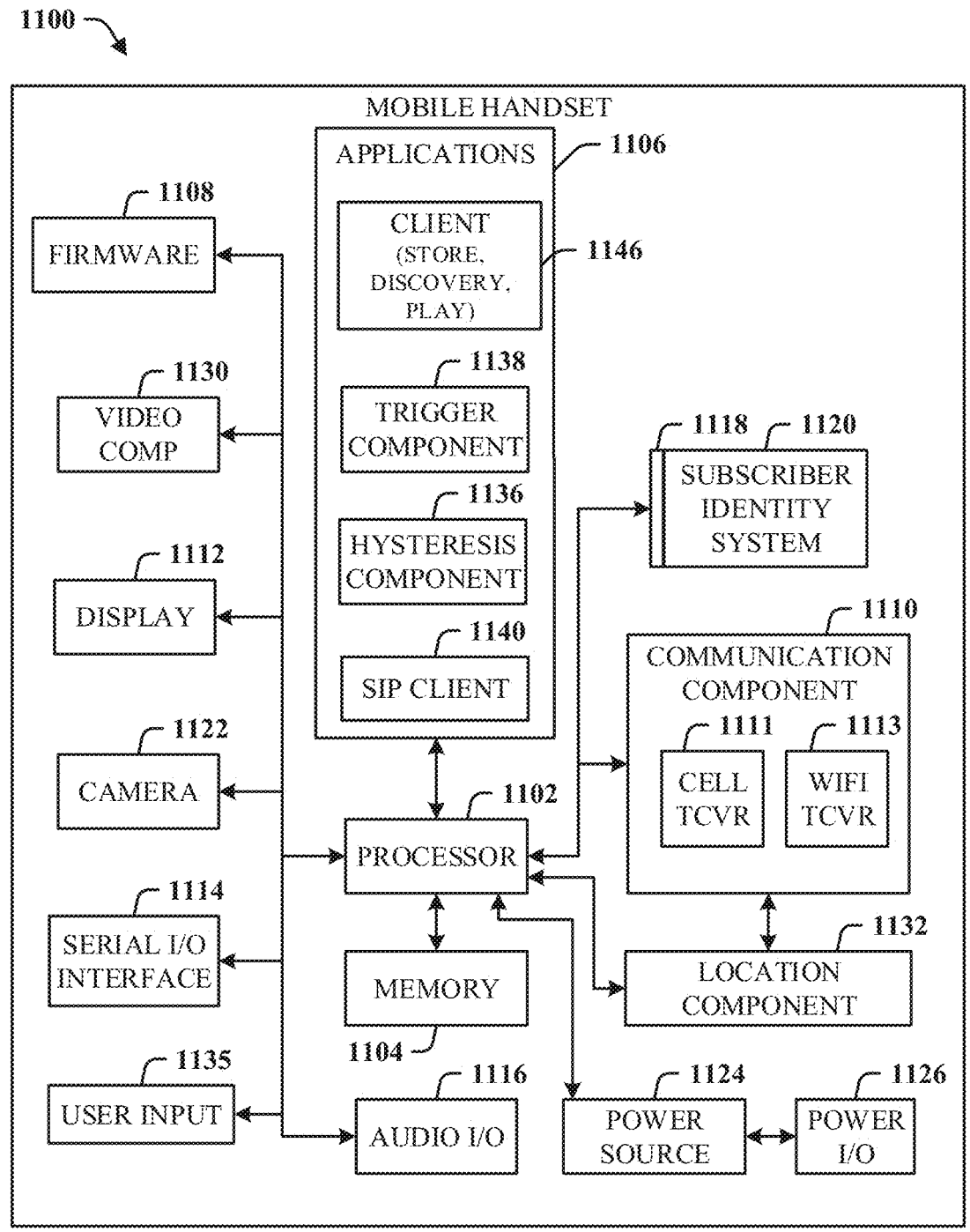
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
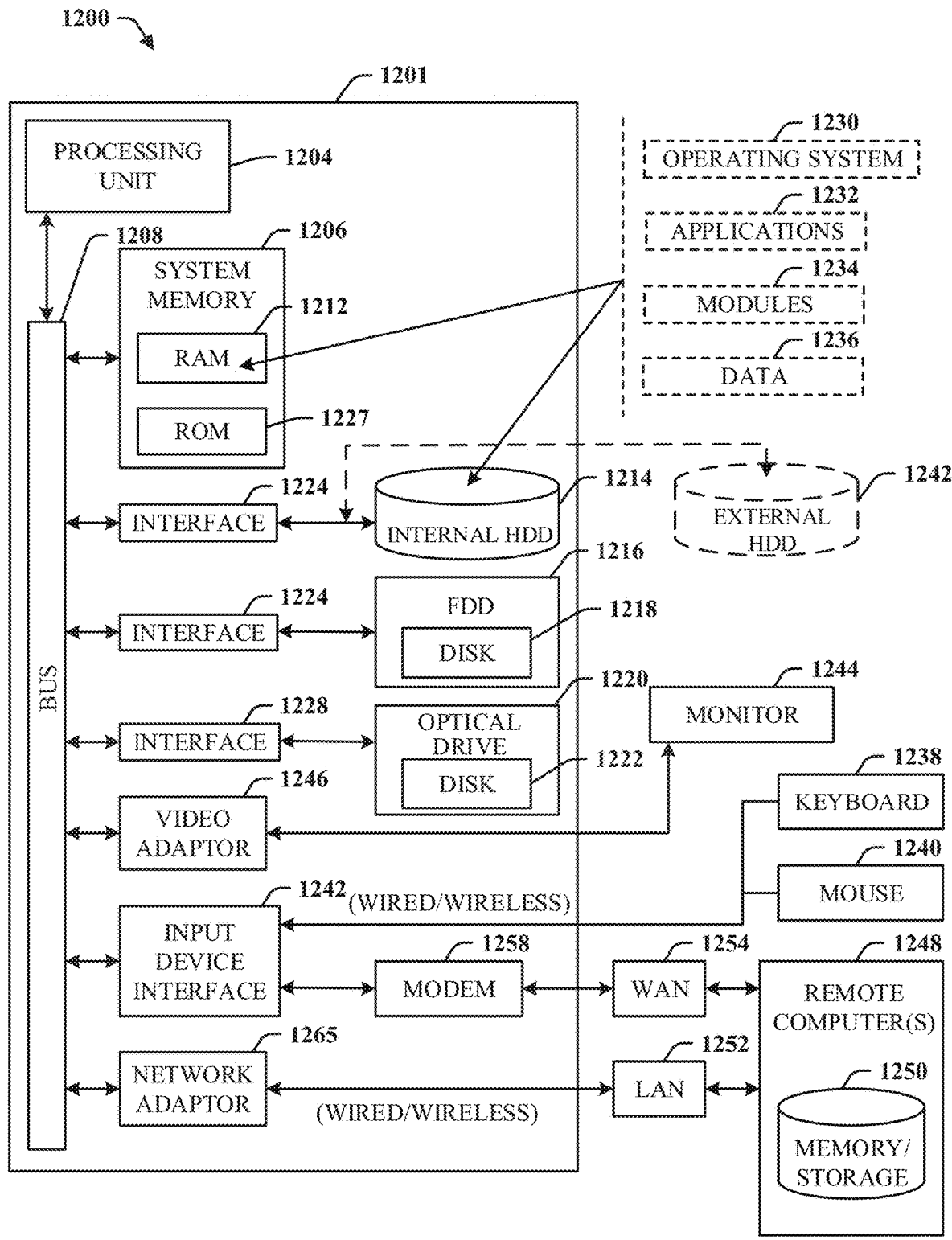
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

sending, by a first mobile device comprising a processor, affiliation data representative of a request to be affiliated with a group of mobile devices associated with emergency services;

sending, by the first mobile device, event type data specifying a type of emergency services event for which the first mobile device is to be notified by a second mobile device of the group of mobile devices;

in response to the sending the affiliation data and the sending the event type data, receiving, by the first mobile device from the second mobile device, event indication data indicative that an event of the type of emergency services event has occurred;

in response to the receiving the event indication data, sending, by the first mobile device to the second mobile device, location data associated with a location of the first mobile device;

in response to the sending the location data associated with the location of the first mobile device, receiving, by the first mobile device, an indication that the event of the type of the emergency services event has terminated; and based on a threshold value associated with responses from the group of mobile devices being determined to have been satisfied, displaying, by the first mobile device, a status indication via a user interface of the first mobile device.

2. The method of claim 1, wherein the location is a first location, and further comprising:
based on data received from the second mobile device, displaying, by the first mobile device, a second location associated with a third mobile device in relation to the second mobile device.

3. The method of claim 2, further comprising:
generating, by the first mobile device, map data representative of a map of the first mobile device and the third mobile device in relation to the second mobile device; and
displaying, by the first mobile device, the map data.

4. The method of claim 1, wherein the status indication comprises the indication that the event has terminated.

5. The method of claim 1, wherein the indication data comprises map data representative of a geographic location associated with the second mobile device.

6. The method of claim 1, further comprising:
based on a threshold value of responses from the group of the mobile devices being determined to have been satisfied, receiving, by the first mobile device, the indication that the event of the type of the emergency services event has terminated.

7. The method of claim 1, wherein the sending the location data associated with the location of the first mobile device comprises sending identification data representative of a user identity associated with the first mobile device.

8. A system, comprising:
a processor; and
a memory that stores executable instructions that, when executed by the processor, facilitate performance of operations, comprising:
sending affiliation data representative of a request to be affiliated with a group of mobile devices associated with emergency services;
sending event type data specifying a type of emergency services event for which a first mobile device is to be notified by a second mobile device of the group of mobile devices;
in response to the sending the affiliation data and the sending the event type data, receiving, from the second mobile device, event indication data indicative that an event of the type of emergency services event has occurred;
in response to the receiving the event indication data, sending, to the second mobile device, location data associated with a location of the first mobile device;
in response to the sending the location data associated with the location of the first mobile device, receiving an indication that the event of the type of the emergency services event has terminated; and
based on a threshold value associated with responses from the group of mobile devices being determined to have been satisfied, facilitating displaying a status indication via a user interface of the first mobile device.

9. The system of claim 8, wherein the sending the event indication data is based on the location associated with the first mobile device.

10. The system of claim 9, wherein the location is first location, and wherein the sending the event indication data is further based on a distance between the first location and a second location associated with the second mobile device.

11. The system of claim 8, wherein the indication is a first indication, and wherein the operations further comprise:
in response to the sending the event indication data, receiving a second indication that user input associated with a user identity received via the first mobile device accepted an action to be performed.

12. The system of claim 11, wherein the user input is first user input, and wherein the operations further comprise:
receiving a third indication that second user input associated with the user identity received via the first mobile device has terminated performance of the action.

13. The system of claim 8, wherein the event indication data comprises map data representative of a geographic location associated with the second mobile device.

14. The system of claim 13, wherein the map data is displayed via a display screen of the first mobile device.

15. A non-transitory machine-readable medium, comprising executable instructions that, when executed by a processor, facilitate performance of operations, comprising:
sending association data representative of a request to be associated with a group of mobile devices associated with an emergency service;
sending event type data specifying a type of the emergency service for which a first mobile device is to be notified by a second mobile device of the group of mobile devices;
in response to the sending the association data and the sending the event type data, facilitating receiving, from the second mobile device, event indication data indicative that an event of the type of the emergency service has occurred;
in response to the receiving the event indication data, sending, to the second mobile device, location data associated with a location of the first mobile device;
in response to the sending the location data associated with the location of the first mobile device, receiving an indication that the event of the type of the emergency service has terminated; and
based on a threshold value associated with responses from the group of mobile devices being determined to have been satisfied, facilitating displaying a status indication via a user interface of the first mobile device.

16. The non-transitory machine-readable medium of claim 15, wherein the sending the event indication data is based on the location of the first mobile device.

17. The non-transitory machine-readable medium of claim 15, wherein the sending the event indication data is based on a time associated with the emergency services event having occurred.

18. The non-transitory machine-readable medium of claim 15, wherein the first mobile device is a drone device.

19. The non-transitory machine-readable medium of claim 18, wherein the operations further comprise: in response to the sending the event indication data, facilitating activating a camera of the drone device.

20. The non-transitory machine-readable medium of claim 15, wherein the operations further comprise: in response to the sending the event indication data, receiving the indication that the emergency services event has terminated.

* * * * *